United States Patent
Jamison et al.

(12) United States Patent (10) Patent No.: US 10,920,570 B2
(45) Date of Patent: *Feb. 16, 2021

(54) MEASUREMENT OF TORQUE WITH SHEAR STRESS SENSORS

(71) Applicant: Halliburton Energy Services, Inc., Houston, TX (US)

(72) Inventors: Dale E. Jamison, Humble, TX (US); Andrew D. Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,016

(22) Filed: Jul. 12, 2019

(65) Prior Publication Data

US 2021/0010878 A1   Jan. 14, 2021

(51) Int. Cl.
| | |
|---|---|
| *E21B 47/007* | (2012.01) |
| *G01L 3/00* | (2006.01) |
| *G01L 3/04* | (2006.01) |
| *G01L 5/00* | (2006.01) |
| *G01L 3/06* | (2006.01) |
| *G01L 3/10* | (2006.01) |

(52) U.S. Cl.
CPC .............. *E21B 47/007* (2020.05); *G01L 3/04* (2013.01); *G01L 3/06* (2013.01); *G01L 3/10* (2013.01); *G01L 5/0042* (2013.01)

(58) Field of Classification Search
CPC ..... E21B 47/0006; G01L 3/06; G01L 5/0042; G01L 3/04; G01L 3/10
See application file for complete search history.

(56) References Cited

U.S. PATENT DOCUMENTS

| | | | |
|---|---|---|---|
| 3,304,528 A | 2/1967 | Rastrelli et al. | |
| 3,827,294 A * | 8/1974 | Anderson | E21B 47/0006 73/152.48 |
| 3,855,857 A | 12/1974 | Claycomb | |

(Continued)

FOREIGN PATENT DOCUMENTS

| | | |
|---|---|---|
| EP | 1712890 A2 | 10/2006 |
| WO | 2008022960 A1 | 2/2008 |

(Continued)

OTHER PUBLICATIONS

Acknowledgement receipt and specification for patent application entitled "Lubricity Testing with Shear Stress Sensors," by Dale E. Jamison, et al., filed Jul. 12, 2019 as U.S. Appl. No. 16/510,002.

(Continued)

*Primary Examiner* — Taras P Bemko
*Assistant Examiner* — Jonathan Malikasim
(74) *Attorney, Agent, or Firm* — Conley Rose, P.C.; Rodney B. Carroll (57) ABSTRACT

A torque measurement tool and method of use is presented which comprises a first outer shaft extending along a longitudinal axis and containing a second inner shaft positioned within the first outer shaft and extending along the longitudinal axis, A flexible coupling is positioned between the first outer shaft and the second inner shaft. A shear stress sensor is positioned within the second inner shaft, is exposed to the first outer shaft and contacts the flexible coupling.

6 Claims, 5 Drawing Sheets

(56) References Cited

U.S. PATENT DOCUMENTS

| | | | |
|---|---|---|---|
| 3,876,972 A * | 4/1975 | Garrett | E21B 17/00 |
| | | | 367/82 |
| 3,926,265 A * | 12/1975 | Bouyoucos | E21B 17/00 |
| | | | 173/80 |
| 4,062,225 A | 12/1977 | Murphy, Jr. et al. | |
| 4,483,197 A | 11/1984 | Kellner | |
| 4,592,226 A | 6/1986 | Weber et al. | |
| 4,811,597 A | 3/1989 | Hebel | |
| 5,163,317 A | 11/1992 | Ono et al. | |
| 5,199,298 A | 4/1993 | Ng et al. | |
| 5,341,886 A | 8/1994 | Patton | |
| 5,386,724 A | 2/1995 | Das et al. | |
| 6,068,394 A | 5/2000 | Dublin, Jr. | |
| 6,341,532 B1 | 1/2002 | Xu et al. | |
| 6,418,776 B1 | 7/2002 | Gitis et al. | |
| 6,426,796 B1 | 7/2002 | Pulliam et al. | |
| 6,499,336 B1 | 12/2002 | Raffer | |
| 6,575,025 B1 | 6/2003 | Demia | |
| 6,629,451 B1 | 10/2003 | Taylor | |
| 6,817,223 B2 | 11/2004 | Lenz | |
| 7,234,517 B2 | 6/2007 | Streich et al. | |
| 7,311,009 B2 * | 12/2007 | Kotovsky | G01L 1/18 |
| | | | 438/50 |
| 7,338,202 B1 | 3/2008 | Kapat et al. | |
| 7,526,941 B2 | 5/2009 | Doe | |
| 7,597,142 B2 * | 10/2009 | Hartog | E21B 17/025 |
| | | | 166/250.01 |
| 7,701,586 B2 | 4/2010 | Otugen et al. | |
| 7,757,552 B2 | 7/2010 | Bogath et al. | |
| 8,375,771 B1 | 2/2013 | Bi | |
| 8,794,051 B2 | 8/2014 | Morgan et al. | |
| 8,991,489 B2 | 3/2015 | Redlinger et al. | |
| 9,175,557 B2 * | 11/2015 | Iversen | E21B 44/00 |
| 9,243,882 B2 | 1/2016 | Brookfield | |
| 9,376,906 B2 | 6/2016 | Dalvi et al. | |
| 9,625,333 B2 * | 4/2017 | Jentoft | G01L 5/16 |
| 9,771,790 B2 | 9/2017 | Clark et al. | |
| 10,024,776 B2 | 7/2018 | Khosla et al. | |
| 10,132,733 B2 | 11/2018 | Vinogradov-Nurenberg et al. | |
| 2002/0070050 A1 | 6/2002 | Wassell | |
| 2003/0154772 A1 | 8/2003 | Jackson | |
| 2004/0096614 A1 | 5/2004 | Quigley et al. | |
| 2004/0173009 A1 | 9/2004 | Doe et al. | |
| 2008/0092641 A1 * | 4/2008 | Cahill | B60T 8/52 |
| | | | 73/121 |
| 2009/0013775 A1 | 1/2009 | Bogath et al. | |
| 2009/0188304 A1 | 7/2009 | Eskin et al. | |
| 2012/0319418 A1 | 12/2012 | Nishiwaki | |
| 2015/0021093 A1 | 1/2015 | Clark et al. | |
| 2016/0109348 A1 | 4/2016 | Robert et al. | |
| 2016/0349124 A1 | 12/2016 | Chang | |
| 2017/0022772 A1 | 1/2017 | Tolley et al. | |
| 2017/0122820 A1 | 5/2017 | Peng et al. | |
| 2018/0038780 A1 | 2/2018 | Yang et al. | |
| 2018/0252600 A1 | 9/2018 | Sheplak et al. | |

FOREIGN PATENT DOCUMENTS

| | | |
|---|---|---|
| WO | 2010144538 A2 | 12/2010 |
| WO | 2014150051 A1 | 9/2014 |

OTHER PUBLICATIONS

Acknowledgement receipt and specification for patent application entitled "Fluid Analysis Devices with Shear Stress Sensors," by Dale E. Jamison, et al., filed Jul. 12, 2019 as U.S. Appl. No. 16/510,014.

Acknowledgement receipt and specification for patent application entitled "Measurement of Torque with Shear Stress Sensors," by Andrew D. Vos, et al., filed Jul. 12, 2019 as U.S. Appl. No. 16/510,023.

Office Action dated Aug. 30, 2019 (25 pages), U.S. Appl. No. 16/510,023, filed Jul. 12, 2019.

Office Action dated Sep. 13, 2019 (25 pages), U.S. Appl. No. 16/510,002, filed Jul. 12, 2019.

Office Action dated Sep. 18, 2019 (19 pages), U.S. Appl. No. 16/510,014, filed Jul. 12, 2019.

Final Office Action dated Jan. 3, 2020, 25 pages, U.S. Appl. No. 16/510,023, filed Jul. 12, 2019.

Foreign Communication from Related Application—International Search Report and Written Opinion of the International Searching Authority, International Application No. PCT/US2019/044474, dated Apr. 9, 2020, 11 pages.

Office Action dated Apr. 27, 2020, 21 pages, U.S. Appl. No. 16/510,023, filed Jul. 12, 2019.

Foreign Communication Regarding Related Application—International Search Report and Written Opinion of the International Searching Authority, International Application No. PCT/US2019/044471, dated Apr. 10, 2020, 9 pages.

Final Office Action dated Aug. 5, 2020 (35 pages), U.S. Appl. No. 16/510,023, filed Jul. 12, 2020.

* cited by examiner

MEASUREMENT OF TORQUE WITH SHEAR STRESS SENSORS

BACKGROUND

In drilling wells for oil and gas exploration, various conditions can lead to excessive torque being applied to the drill string. For example, in a well with an undesirably narrow diameter, the outer wall of the drill string may rub against the wall of the well, thereby applying torque to the drill string. Similarly, a borehole cave-in can result in excessive drill string torque, particularly in horizontal wells. Such torque-related concerns also may arise in any of a variety of other contexts, for example, the shaft of a motor or a torque wrench.

BRIEF DESCRIPTION OF THE DRAWINGS

For a detailed description of various examples, reference will now be made to the accompanying drawings in which.

DETAILED DESCRIPTION

Disclosed herein are various examples of systems and techniques for measuring torque in equipment using shear stress sensors, and, more particularly, MEMS shear stress sensors. In some examples, a torque measurement tool includes multiple concentric shafts with a flexible coupling, such as silicone rubber, positioned between the concentric shafts and coupled to the concentric shafts. A MEMS shear stress sensor is mounted on a surface of either of the multiple concentric shafts that faces the flexible coupling. Thus, the MEMS shear stress sensor abuts the flexible coupling. When torque is applied to the outer surface of the torque measurement tool such that the concentric shafts are displaced relative to each other, the flexible coupling experiences shear stress, since it couples to both concentric shafts. Because a sensing surface of the MEMS shear stress sensor abuts the flexible coupling, the sensor senses the shear stress in the flexible coupling. The MEMS shear stress sensor measures this shear stress and provides an electrical signal indicating the measured value to communication equipment (e.g., a BLUETOOTH® chip, a telemetry sub, a wired drill pipe communication cable) or to storage. A computer subsequently processes the shear stress value encoded in the electrical signal to calculate torque. The principles disclosed herein may be implemented in a vast array of applications in which torque is applied, but the specific examples disclosed herein are in the context of wellbore operations. The system and techniques described herein confer multiple technical advantages. For instance, in the oil and gas context, the torque calculation may be used to identify and address potential structural deformities in the wellbore wall, such as narrow-well conditions or a cave-in.

Figure 1:
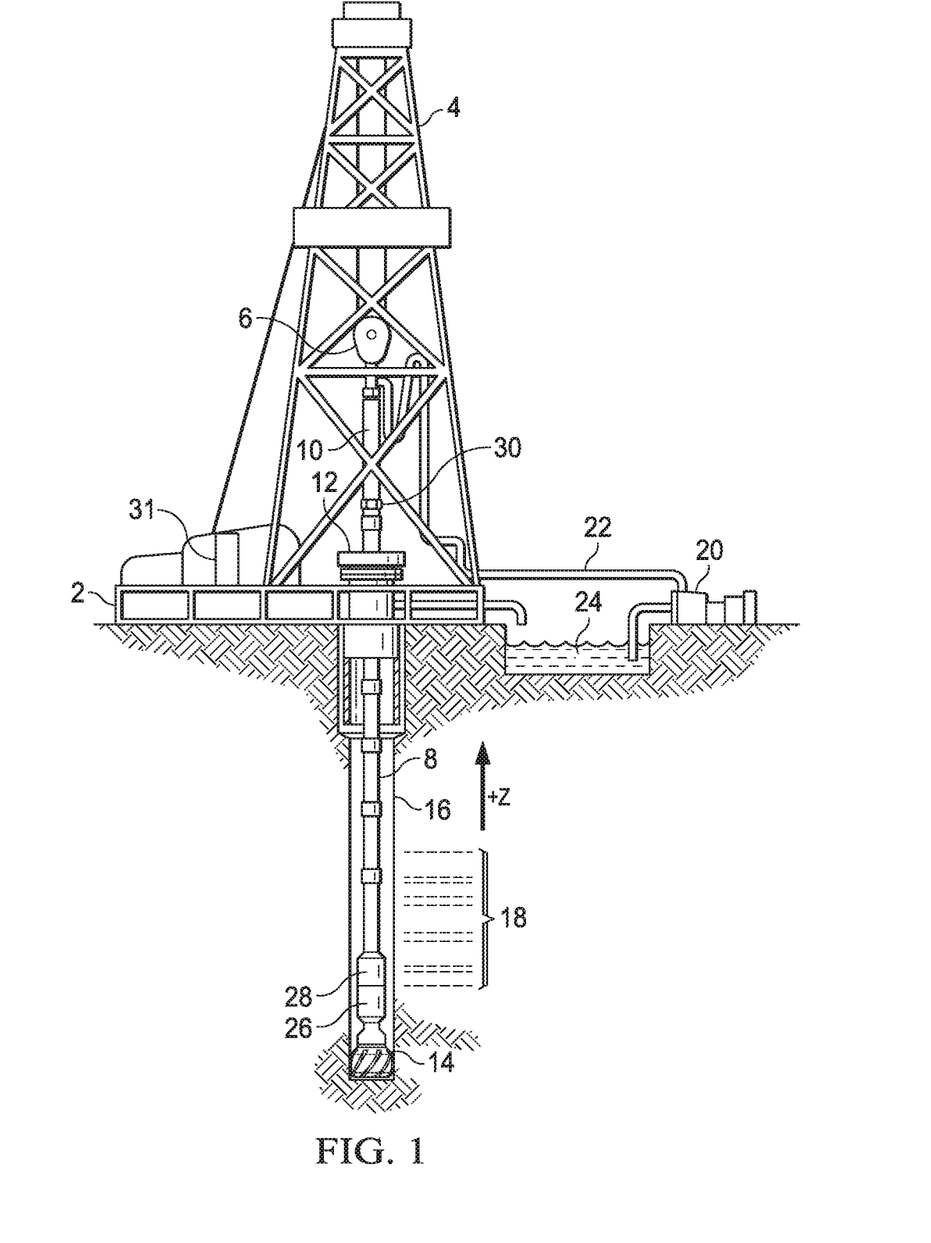
FIG. 1 is a side view of an illustrative logging while drilling (LWD) environment, in accordance with various examples.

FIG. 1 is a side view of an illustrative logging while drilling (LWD) environment, in accordance with various examples. A drilling platform 2 is equipped with a derrick 4 that supports a hoist 6 for raising and lowering a drill string 8. The hoist 6 suspends a top drive 10 suitable for rotating the drill string 8 and lowering the drill string through a well head 12. Connected to the lower end of the drill string 8 is a drill bit 14. As the drill bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via an annulus around drill string 8, and into a retention pit 24. The drilling fluid transports cuttings from the borehole 16 into the retention pit 24 and aids in maintaining the integrity of the borehole 16. Various materials can be used for drilling fluid, including water-based and oil-based fluids.

An assembly of LWD tools 26 is integrated into the bottom-hole assembly near the drill bit 14. As the drill bit 14 extends the borehole 16 through the formations 18, each tool 26 may collect measurements relating to various formation properties, the tool orientation, and/or various other drilling conditions. As illustrated, the assembly of LWD tools 26 may take the form of one or more drill collars, i.e., thick-walled tubulars that provide weight and rigidity to aid the drilling process. (For the present discussion, the assembly of LWD tools 26 is expected to include a torque measurement tool, examples of which are described below.) The assembly of LWD tools 26 may include a telemetry sub 28 to transfer measurement data to a surface receiver 30 and to receive commands from the surface. In some examples, the telemetry sub 28 does not communicate with the surface, but rather stores logging data for later retrieval at the surface when the assembly of LWD tools 26 is recovered.

A computer 31 is coupled to the surface receiver 30 to receive, store, and optionally process and display the measurement data. As discussed further below, computers such as computer 31 include a processor coupled to a memory that stores executable code. The executable code embodies a method which is carried out by the computer when the executable code is executed by the processor. The computer 31 may provide a user interface that enables a user to interact with the executable code, e.g., by viewing and selecting configuration options, viewing results, and optionally repeating the method with different configuration parameters. In at least some examples, the computer 31 operates during the drilling process, enabling a user to analyze measurements in real time and, if desired, to adjust drilling parameters in a timely fashion. Some drillers may rely on logs displayed by the computer to perform geosteering-that is, to steer the borehole 16 relative to a formation bed boundary.

While LWD measurements are desirable because they enable measurements to be acquired while the formations 18 are less affected by fluid invasion, the drilling operations create a high-shock, continuous vibration environment with extended exposure to downhole temperatures and pressures, yielding conditions that are generally hostile to electronic instrumentation, telemetry, and logging tool sensor operations. Consequently, many operators may prefer to conduct at least some of the logging operations with wireline logging tools.

Figure 2:
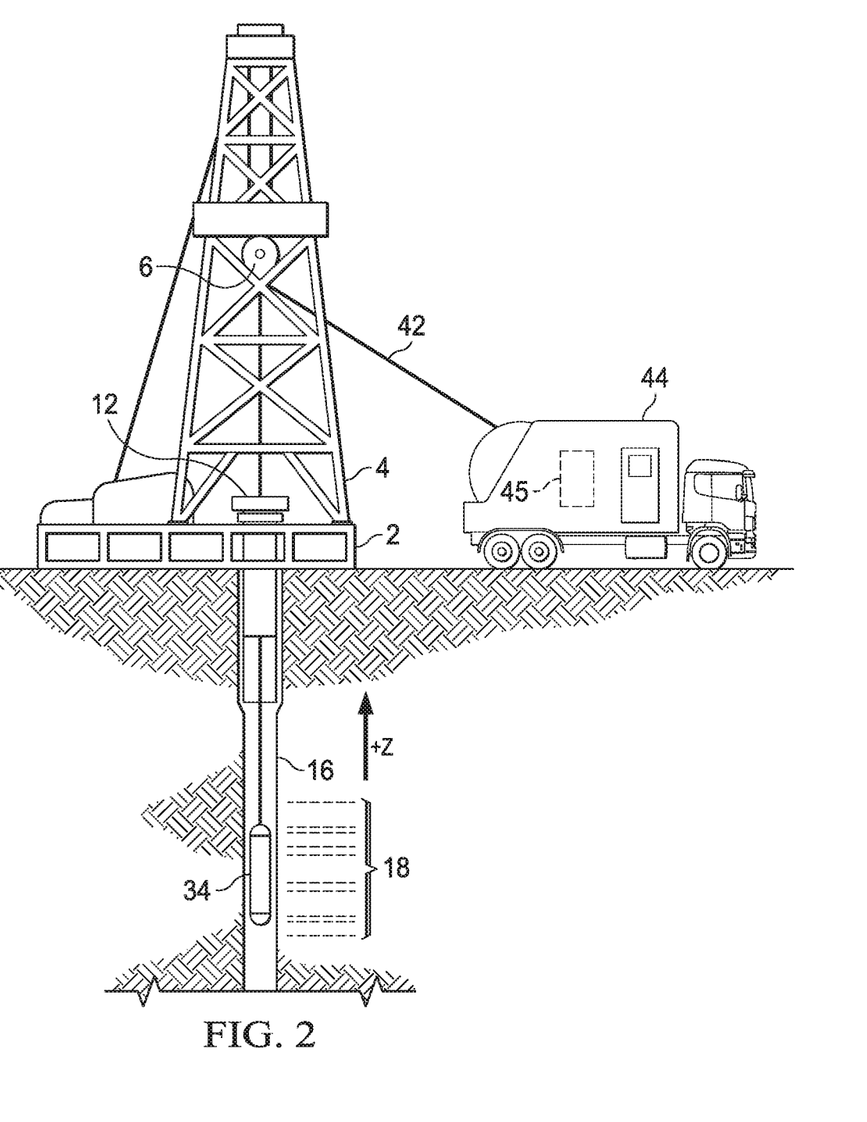
FIG. 2 is a side view of an illustrative wireline logging environment, in accordance with various examples.

FIG. 2 is a side view of an illustrative wireline logging environment, in accordance with various examples. In wireline logging, a sonde (i.e., an assembly of wireline logging tools 34) is lowered into the borehole 16. The assembly of wireline logging tools 34 is suspended at the end of a wireline cable 42 that provides mechanical support to the assembly of wireline logging tools 34 and also provides an electrical connection between the assembly of wireline logging tools 34 and electrical equipment located at the surface, such as a logging facility 44. Wireline cable 42 includes conductors for transporting power to the assembly of wireline logging tools 34 and telemetry from the assembly of wireline logging tools 34 to the logging facility 44. The assembly of wireline logging tools 34 may have pads and/or centralizing springs to maintain the assembly of wireline logging tools 34 near the axis of the borehole 16 as the assembly is pulled toward the surface. For the present discussion, the assembly of wireline logging tools 34 may include a torque measurement tool, examples of which are described below. (Although sondes typically may not experience the same degree of torque as drill strings, they still may experience lesser degrees of torque-for example, when the clearance between the sonde and the borehole wall is small and there is resultant friction between the sonde and the borehole wall.) Logging facility 44 collects measurements from the assembly of wireline logging tools 34, and it includes a computer 45 for processing and storing the measurements gathered by the wireline logging tools. As with computer 31, computer 45 includes a processor coupled to a memory that stores executable code, which may embody one or more of the methods described below.

The scope of this disclosure is not limited to implementation of the disclosed torque measurement tool in measurement-while-drilling (MWD)/LWD and wireline applications. Rather, the disclosed torque measurement tool may be implemented in any of a variety of contexts, including wired drill pipe, wired and unwired coiled tubing, slickline, downhole tractor, and subsea applications. Any and all such applications are contemplated and included within the scope of this disclosure.

Figure 3A:
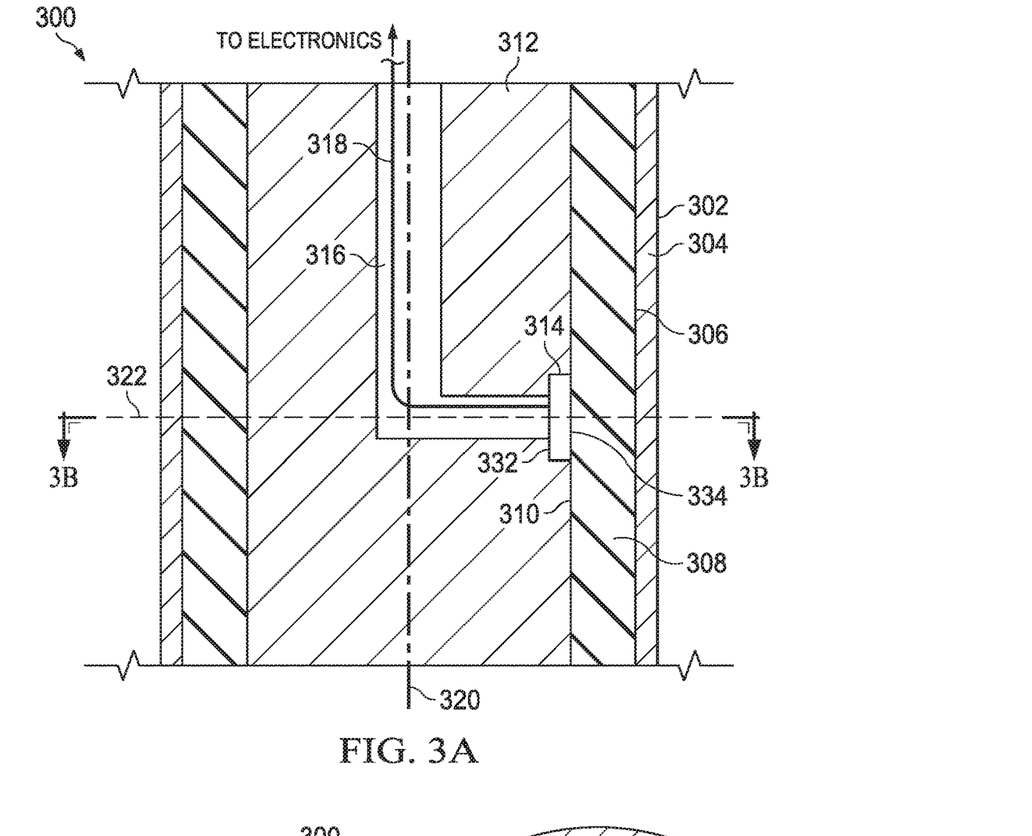
FIG. 3A is a cross-sectional view of a torque measurement tool along a longitudinal axis of the tool, in accordance with various examples.

FIG. 3A is a cross-sectional view of a torque measurement tool 300 along a longitudinal axis 320 of the tool, in accordance with various examples. The torque measurement tool 300 may be deployed in any suitable part of a drill string or a sonde in which torque measurements are desired. The torque measurement tool 300 comprises multiple concentric shafts extending along the longitudinal axis 320, including an outermost shaft 304 and an inner shaft 312 positioned within the outermost shaft 304. In some examples, additional concentric shafts may be housed within the outermost shaft 304. The outermost shaft 304 includes an outer surface 302 and an inner surface 306. The inner shaft 312 includes an outer surface 310. The volume between the inner surface 306 and the outer surface 310 houses a flexible coupling 308 that couples to the inner surface 306 and the outer surface 310. The flexible coupling 308 may adhere to these surfaces without the need for additional adhesives. Examples of the flexible coupling 308 include: silicone rubber; urethane rubber; natural rubber (polyisoprene); styrene- butadiene-rubber; ethylene propylene diene monomer rubber (EPDM); butylrubber; polyurethane; NEOPRENE CR®(polychloroprene); hydrogenated nitrile; HYPALON® chlorosulphonated polyethylene; nitrile; VITON®; fluorosilicone; and fluorocarbon. Other examples are contemplated and included in the scope of this disclosure.

A shear stress sensor 314 (e.g., a MEMS shear stress sensor, such as a DIRECTSHEAR® sensor manufactured by IC²® of Gainesville, FL) is positioned within recess 332 of the inner shaft 312. More specifically, the shear stress sensor 314 is exposed to the outer surface 310 such that contact surface 334 of the shear stress sensor 314 abuts the flexible coupling 308. This may be accomplished, for example, via an orifice in the outer surface 310 through which the shear stress sensor 314 is exposed to the outer surface 310. The shear stress sensor 314 couples to electronics (not expressly shown; e.g., a computer, a telemetry sub, wireless communication equipment, communication cables of a wired drill pipe, storage in the inner shaft 312 or in a nearby sub) via a cable 318 that is positioned within a channel 316 in the inner shaft 312. Such electronics may, e.g., process measurements received from the shear stress sensor 314, log measurements received from the shear stress sensor 314, etc.

In an example operation, torque is applied to the torque measurement tool 300 such that it causes positional displacement between the inner shaft 312 and the outermost shaft 304. As a result, the flexible coupling 308 experiences shear stress. The shear stress sensor 314 measures this shear stress, generates an electrical signal indicating the shear stress measurement, and outputs the electrical signal on cable 318.

In some examples, multiple shear stress sensors may be used along the length of the inner shaft 312, as desired and as may be appropriate.

Figure 3B:
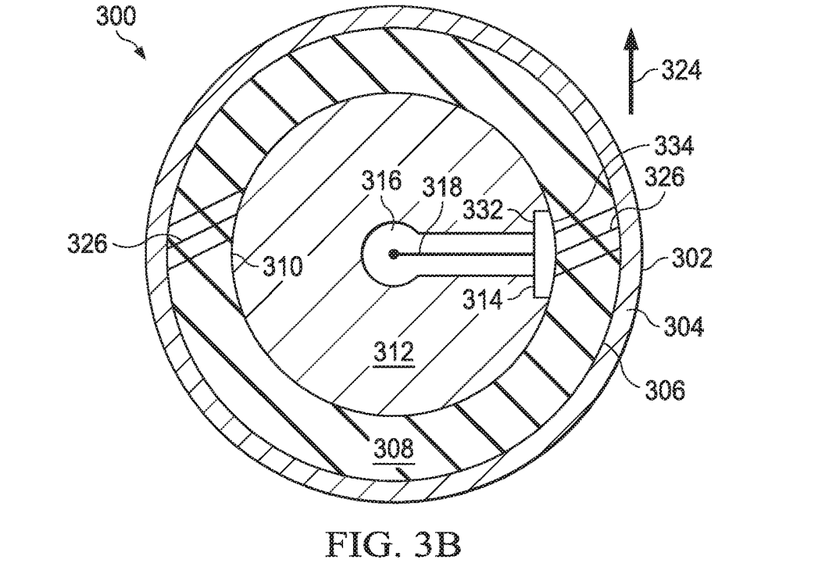
FIG. 3B is cross-sectional view of a torque measurement tool orthogonal to a longitudinal axis of the tool, in accordance with various examples.

FIG. 3B is cross-sectional view of the torque measurement tool 300 along line 322 (FIG. 3A), in accordance with various examples. As explained above, as torque is applied to the outermost shaft 304 (e.g., as arrow 324 indicates), shear stress is imparted to the flexible coupling 308 (e.g., as stress lines 326 indicate). The shear stress sensor 314 measures this shear stress and outputs an electrical signal indicating this shear stress on the cable 318.

Figure 4A:
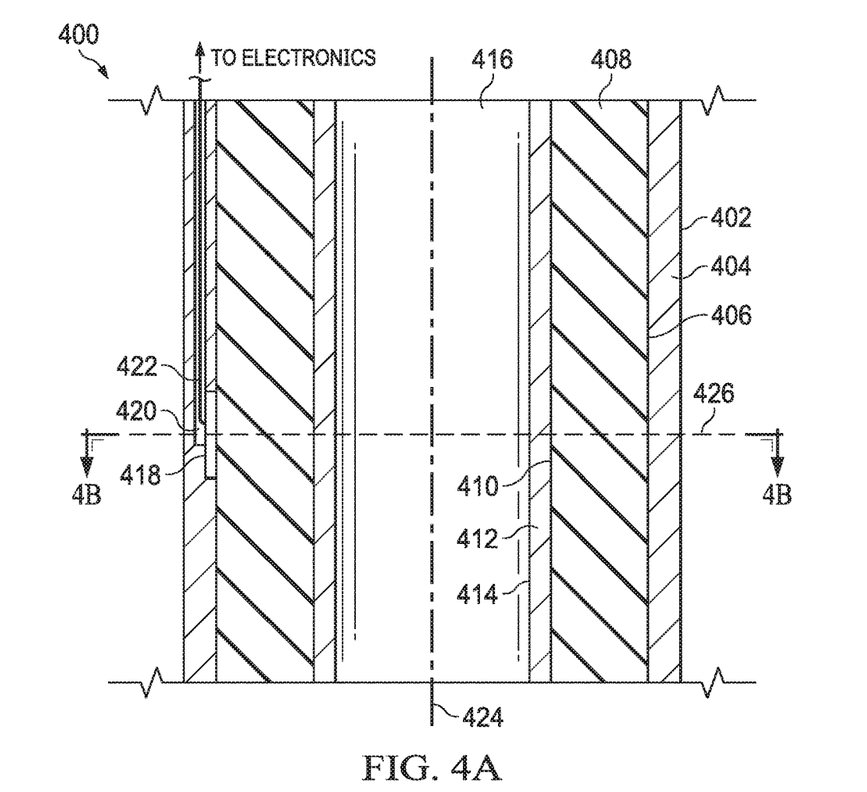
FIG. 4A is a cross-sectional view of a torque measurement tool along a longitudinal axis of the tool, in accordance with various examples.

FIG. 4A is a cross-sectional view of a torque measurement tool 400 along a longitudinal axis 424 of the tool 400, in accordance with various examples. The torque measurement tool 400 may be deployed in any suitable part of a drill string or a sonde in which torque measurements are desired. The torque measurement tool 400 comprises multiple concentric shafts extending along the longitudinal axis 424, including an outermost shaft 404 and an inner shaft 412 positioned within the outermost shaft 404. In some examples, additional concentric shafts may be housed within the outermost shaft 404. The outermost shaft 404 includes an outer surface 402 and an inner surface 406. The inner shaft 412 includes an outer surface 410 and an inner surface 414. The volume between the inner surface 406 and the outer surface 410 houses a flexible coupling 408 that couples to the inner surface 406 and the outer surface 410. Examples of the flexible coupling 408 include: silicone rubber; urethane rubber; natural rubber (polyisoprene); styrene-butadiene-rubber; ethylene propylene diene monomer rubber (EPDM); butylrubber; polyurethane; NEOPRENE CR®(polychloroprene); hydrogenated nitrile; HYPALON® chlorosulphonated polyethylene; nitrile; VITON®; fluorosilicone; and fluorocarbon. Other examples are contemplated and included in the scope of this disclosure. The inner shaft 412 includes a hollow cavity 416 through which drilling fluid may flow.

A shear stress sensor 418 (e.g., a MEMS shear stress sensor, such as a DIRECTSHEAR® sensor manufactured by IC²® of Gainesville, Fla.) is positioned within the outermost shaft 404. More specifically, the shear stress sensor 418 is exposed to the inner surface 406 such that the shear stress sensor 418 abuts the flexible coupling 408. This may be accomplished, for example, via an orifice in the inner surface 406 through which the shear stress sensor 418 is exposed to the inner surface 406. The shear stress sensor 418 couples to electronics (not expressly shown; e.g., a computer, a telemetry sub, wireless communication equipment, communication cables of a wired drill pipe, storage in the outermost shaft 404 or in a nearby sub) via a cable 422 that is positioned within a channel 420 in the outermost shaft 404. Such electronics may, e.g., process measurements received from the shear stress sensor 418, log measurements received from the shear stress sensor 418, etc.

In an example operation, torque is applied to the torque measurement tool 400 such that it causes positional displacement between the inner shaft 412 and the outermost shaft 404. As a result, the flexible coupling 408 experiences shear stress. The shear stress sensor 418 measures this shear stress, generates an electrical signal indicating the shear stress measurement, and outputs the electrical signal on cable 422. In some examples, multiple shear stress sensors may be used along the length of the outermost shaft 404, as desired and as may be appropriate.

Figure 4B:
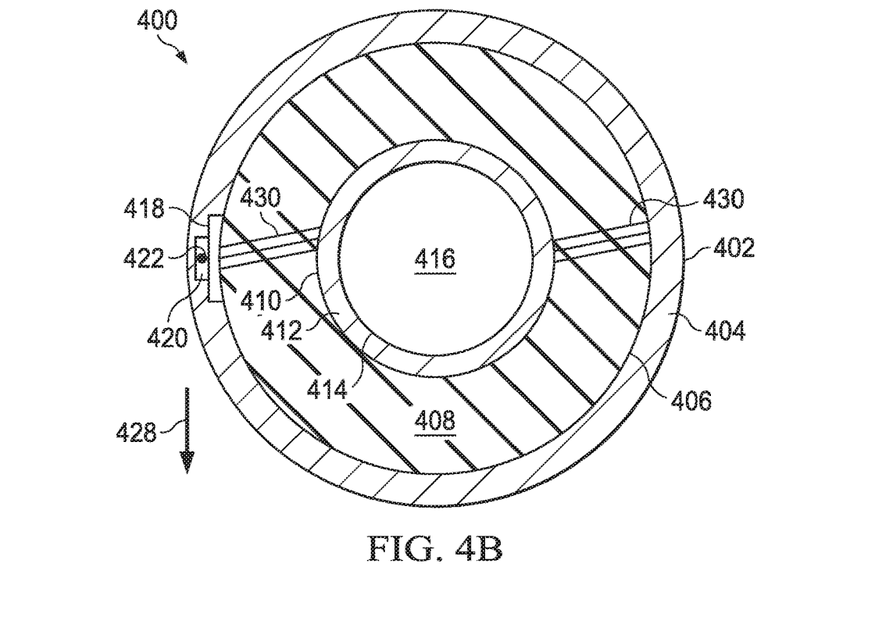
FIG. 4B is a cross-sectional view of a torque measurement tool orthogonal to a longitudinal axis of the tool, in accordance with various examples.

FIG. 4B is cross-sectional view of the torque measurement tool 400 along line 426 (FIG. 4A), in accordance with various examples. As explained above, torque applied to the outermost shaft 404 (e.g., as arrow 428 indicates) results in shear stress being imparted to the flexible coupling 408, as stress lines 430 indicate. The shear stress sensor 418 measures this shear stress and outputs an electrical signal indicating this shear stress on the cable 422.

Figures 5, 6, 7:
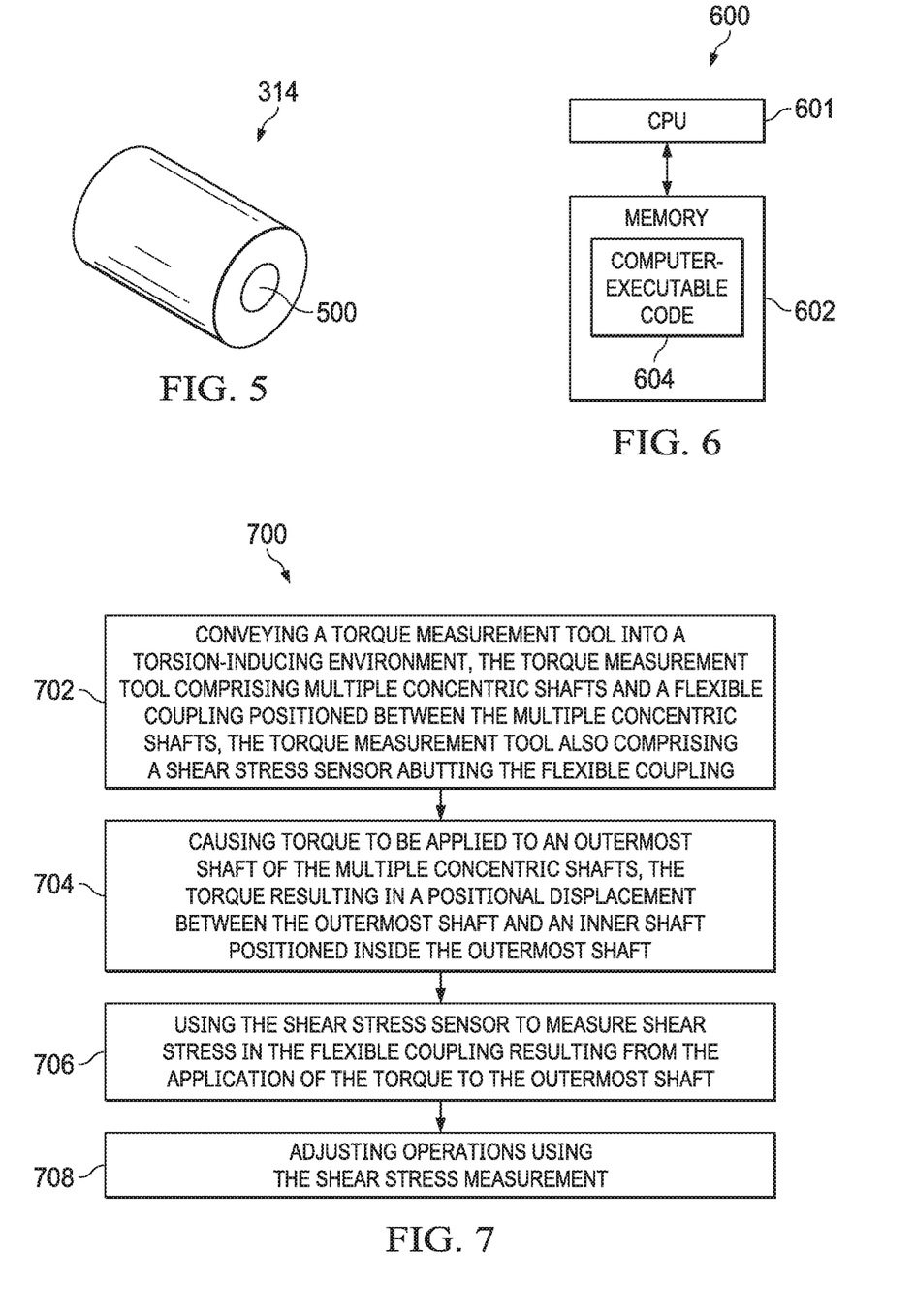
FIG. 5 is a perspective view of a shear stress sensor, in accordance with various examples.
FIG. 6 is a schematic diagram of processing logic, in accordance with various examples.
FIG. 7 is a flow diagram of an illustrative method to measure torque using a shear stress sensor, in accordance with various examples.

FIG. 5 is a perspective view of the shear stress sensor 314 (e.g., a MEMS shear stress sensor) (FIGS. 3A and 3B), in accordance with various examples. The shear stress sensor 314 depicted in FIG. 5 is also representative of the shear stress sensor 418 implemented in FIGS. 4A and 4B. The shear stress sensor 314 includes a sensing surface 500 which, when abutting a flexible coupling (e.g., flexible couplings 308, 408), measures the shear stress present in the flexible coupling and outputs an electrical signal indicating the measured shear stress. As explained above, in some examples, the shear stress sensor 314 is a DIRECTSHEAR® sensor manufactured by IC²® of Gainesville, Fla. In some examples, the thickness of the shear stress sensor 314 as measured from the sensing surface 500 to the opposing, parallel surface of the shear stress sensor 314 is, e.g., less than or equal to 25 millimeters.

FIG. 6 is a schematic diagram of processing logic 600 implemented in the computer 31 (FIG. 1) or the computer 45 (FIG. 2), in accordance with various examples. The processing logic 600 includes a central processing unit (CPU) 601 that couples to memory 602 (e.g., random access memory, read-only memory), as shown in FIG. 6. In at least some such examples, the memory 602 stores computer-executable code 604, which, when executed by the CPU 601, causes the CPU 601 to perform some or all of the functions described herein, including the functions described below with reference to FIG. 7. In some examples, the processing logic 600 comprises a field programmable gate array ("FPGA"), which may be programmed using an appropriate bitstream to cause it to perform some or all of the functions described herein. In some examples, the processing logic 600 comprises a combination of an FPGA and the components depicted in FIG. 6, with the combination operating in tandem to perform some or all of the functions described herein. Any and all such combinations are contemplated and included in the scope of this disclosure. In some examples, the processing logic 600 is positioned downhole, for example, in a telemetry sub. In some examples, the processing logic 600 is positioned at the surface such that electrical signals from the torque measurement tools 300, 400 are communicated to the surface via telemetry and subsequently processed by the processing logic 600.

In some examples, the processing logic 600 receives electrical signals indicating measured shear stress in the aforementioned flexible couplings and calculates a torque value according to the equation $$T = \sigma Ark$$

where T is the torque, $\sigma$ is the shear stress measurement, A is the sensor area, r is the distance from the center of the tool to the shear stress sensor, and k is the calibration constant for system stiffness. The torque value may be used to attain any number of technical advantages. For example, in the oil and gas context, the torque calculation may be used to identify and address potential structural deformities in the wellbore wall, such as narrow-well conditions or a cave-in.

FIG. 7 is a flow diagram of an illustrative method 700 to measure torque using a torque measurement tool (and, more particularly, a MEMS shear stress sensor), in accordance with various examples. The method 700 begins by conveying a torque measurement tool into a torsion-inducing environment, such as a wellbore (step 702). The torque measurement tool comprises multiple concentric shafts and a flexible coupling positioned between the multiple concentric shafts. The torque measurement tool also comprises a shear stress sensor abutting the flexible coupling. The method 700 further comprises causing torque to be applied to an outermost shaft of the multiple concentric shafts, with the torque resulting in a positional displacement between the outermost shaft and an inner shaft positioned inside the outermost shaft (step 704). The method 700 still further comprises using the shear stress sensor to measure shear stress in the flexible coupling resulting from the application of the torque to the outermost shaft (step 706). The method 700 further includes adjusting operations using the shear stress measurement (step 708). For example, drilling operations may be adjusted (e.g., reducing weight on bit) based on the shear stress measurement and/or a torque calculation that is a function of the shear stress measurement. Any of the examples of torque measurement tools described herein may be used to perform at least some of the steps of the method 700, as may other examples that are not specifically described herein. Such examples include any torque measurement tools that apply the principle of torque and shear stress measurement using a shear stress sensor abutting a flexible coupling in a downhole tool. In addition, the various examples described above could be reconfigured to measure other types of stress. For example, the shear stress sensor may be reoriented to measure axial stress. Any and all such possibilities are contemplated and fall within the scope of this disclosure.

In the foregoing discussion and in the claims, the terms "including" and "comprising" are used in an open-ended fashion, and thus should be interpreted to mean "including, but not limited to . . . ." Unless otherwise stated, "about," "approximately," or "substantially" preceding a value means +/- 10 percent of the stated value. The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In some examples, a torque measurement tool comprises a first shaft extending along a longitudinal axis; a second shaft positioned within the first shaft and extending along the longitudinal axis; a flexible coupling positioned between the first and second shafts, the flexible coupling coupled to a first surface of the first shaft and to a second surface of the second shaft; and a shear stress sensor positioned within the second shaft, the shear stress sensor exposed to the second surface of the second shaft and abutting the flexible coupling. The tool may be supplemented using one or more of the following concepts, in any order and in any combination: wherein the second shaft includes a channel, and wherein the channel houses a cable coupled to the shear stress sensor; wherein the shear stress sensor comprises a micro-electro-mechanical- system (MEMS) shear stress sensor; wherein the flexible coupling is selected from the group consisting of: silicone rubber; urethane rubber; natural rubber; styrene-butadiene rubber; butylrubber; and combinations thereof.

In some examples, a torque measurement tool comprises a first shaft extending along a longitudinal axis; a second shaft positioned within the first shaft and extending along the longitudinal axis, the second shaft including a hollow cavity; a flexible coupling positioned between the first and second shafts, the flexible coupling coupled to a first surface of the first shaft and to a second surface of the second shaft; and a shear stress sensor positioned within the first shaft, the shear stress sensor exposed to the first surface of the first shaft and abutting the flexible coupling. The tool may be supplemented using one or more of the following concepts, in any order and in any combination: wherein the hollow cavity is a drilling fluid cavity; wherein the flexible coupling is selected from the group consisting of: polyurethane; polychloroprene; hydrogenated nitrile; polyethylene; fluorosilicone; fluorocarbon; and combinations thereof; wherein the shear stress sensor comprises a micro-electro-mechanical system (MEMS) shear stress sensor; wherein the first shaft comprises a channel housing a cable coupled to the shear stress sensor.

In some examples, a method comprises conveying a torque measurement tool into a torsion-inducing environment, the torque measurement tool comprising multiple concentric shafts and a flexible coupling positioned between the multiple concentric shafts, the torque measurement tool also comprising a shear stress sensor abutting the flexible coupling. The method also comprises causing torque to be applied to an outermost shaft of the multiple concentric shafts, the torque resulting in a positional displacement between the outermost shaft and an inner shaft positioned inside the outermost shaft. The method further comprises using the shear stress sensor to measure shear stress in the flexible coupling resulting from the application of the torque to the outermost shaft. The method also comprises adjusting operations using the shear stress measurement. The method may be supplemented using one or more of the following concepts, in any order and in any combination: wherein the shear stress sensor is positioned on an inner surface of the outermost shaft, the surface facing a longitudinal axis of the outermost shaft; wherein the shear stress sensor is positioned on an outer surface of the inner shaft, the outer surface facing away from the longitudinal axis of the inner shaft; wherein the shear stress sensor comprises a micro-electro-mechanical system (MEMS) shear stress sensor; wherein the inner shaft comprises a drilling fluid cavity; wherein the inner shaft comprises a channel housing a cable coupled to the shear stress sensor; wherein the outermost shaft comprises a channel housing a cable coupled to the shear stress sensor; wherein the flexible coupling is selected from the group consisting of: silicone rubber; urethane rubber; natural rubber; styrene-butadiene- rubber; butylrubber; polyurethane; polychloroprene; nitrile; hydrogenated nitrile; chlorosulphonated polyethylene; fluorosilicone; fluorocarbon; and combinations thereof.

What is claimed is:

1. A torque measurement tool, comprising:
   an outer cylindrical shaft extending along a longitudinal axis and having an inner bore with an inner surface;
   an inner cylindrical shaft positioned within the inner bore of the outer cylindrical shaft and extending along the longitudinal axis, the inner cylindrical shaft having an outer surface;
   a flexible coupling positioned within an annular space between the inner surface of the outer cylindrical shaft and the outer surface of the inner cylindrical shaft, the flexible coupling directly coupled to the inner-surface of the outer cylindrical shaft and to the outer surface of the inner cylindrical shaft such that the flexible coupling couples the outer surface of the inner cylindrical shaft with the inner surface of the outer cylindrical shaft; and
   a micro-electro-mechanical-system (MEMS) shear stress sensor positioned within a recess located on the outer surface of the inner cylindrical shaft, the shear stress sensor having a contact surface positioned about flush to the outer surface of the inner cylindrical shaft and in contact with the flexible coupling.

2. The tool of claim 1, wherein the inner cylindrical shaft includes a channel, and wherein the channel houses a cable coupled to the shear stress sensor.

3. The tool of claim 1, wherein the flexible coupling is selected from the group consisting of: silicone rubber; urethane rubber; natural rubber; styrene-butadiene rubber; butylrubber; and combinations thereof.

4. A method, comprising:
   conveying a torque measurement tool into a torsion-inducing environment, the torque measurement tool comprising:
   an outer cylindrical shaft extending along a longitudinal axis and having an inner bore with an inner surface;
   an inner cylindrical shaft positioned within the inner bore of the outer cylindrical shaft and extending along the longitudinal axis, the inner cylindrical shaft having an outer surface;
   a flexible coupling positioned within an annular space between the inner surface of the outer cylindrical shaft and the outer surface of the inner cylindrical shaft, the flexible coupling directly coupled to the inner surface of the outer cylindrical shaft and to the outer surface of the inner cylindrical shaft such that the flexible coupling couples the outer surface of the inner cylindrical shaft with the inner surface of the outer cylindrical shaft; and
   a micro-electro-mechanical-system (MEMS) shear stress sensor positioned within a recess located on the outer surface of the inner cylindrical shaft, the shear stress sensor having a contact surface positioned about flush to the outer surface of the inner cylindrical shaft and in contact with the flexible coupling;
   causing torque to be applied to the outer cylindrical shaft, the torque resulting in a positional displacement between the outer cylindrical shaft and the inner cylindrical shaft positioned inside the outer cylindrical shaft;

using the shear stress sensor to measure shear stress in the flexible coupling resulting from the torque applied to the outer cylindrical shaft; and adjusting operations using the shear stress measurement.

5. The method of claim 4, wherein the inner cylindrical shaft comprises a channel housing a cable coupled to the shear stress sensor.

6. The method of claim 4, wherein the flexible coupling is selected from the group consisting of: silicone rubber; urethane rubber; natural rubber; styrene-butadiene-rubber; butylrubber; polyurethane; polychloroprene; nitrile; hydrogenated nitrile; chlorosulphonated polyethylene; fluorosilicone; fluorocarbon; and combinations thereof.

* * * * *

UNITED STATES PATENT AND TRADEMARK OFFICE
CERTIFICATE OF CORRECTION

PATENT NO. : 10,920,570 B2
APPLICATION NO. : 16/510016
DATED : February 16, 2021
INVENTOR(S) : Dale E. Jamison and Andrew D. Vos Page 1 of 1

It is certified that error appears in the above-identified patent and that said Letters Patent is hereby corrected as shown below:

In the Specification

Column 6, Line 64, replace "+1- 10 percent of the stated value" with --+/- 10 percent of the stated value--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*